United States Patent [19]

Mahon

[11] Patent Number: 5,246,167
[45] Date of Patent: Sep. 21, 1993

[54] DROPLET APPLICATION DEVICE AND METHOD

[76] Inventor: John K. J. Mahon, P.O. Box 898, Wagga Wagga, New South Wales Aust 2650, Australia

[21] Appl. No.: 883,553

[22] Filed: May 15, 1992

[51] Int. Cl.$^5$ .................... B05B 3/02; B05B 9/04; B05B 9/08

[52] U.S. Cl. ................... 239/154; 239/214; 239/215; 239/219

[58] Field of Search ............ 239/214, 215, 154, 219, 239/222.11, 223, 224

[56] References Cited

U.S. PATENT DOCUMENTS

| 408,631 | 8/1889 | Stiebel | 239/214 |
|---|---|---|---|
| 2,556,447 | 6/1951 | Robertson | 239/215 |
| 4,997,129 | 3/1991 | Waldrum | 239/154 |
| 5,020,725 | 6/1991 | Waldrum | 239/154 |

FOREIGN PATENT DOCUMENTS

| 263506 | 5/1963 | Australia | 239/154 |
|---|---|---|---|
| 929758 | 6/1955 | Fed. Rep. of Germany | 239/154 |
| 1032828 | 7/1953 | France | 239/154 |
| 1554947 | 1/1969 | France | 239/154 |
| 874006 | 10/1981 | U.S.S.R. | 239/219 |

Primary Examiner—Andres Kashnikow
Assistant Examiner—Lesley D. Morris
Attorney, Agent, or Firm—Darby & Darby

[57] ABSTRACT

A droplet applicator (3) utilised for the application of concentrated chemicals, e.g. fertiliser, pesticides or herbicides. The applicator device (3) is comprised of a plurality of fibres (9) extending and rotatable about a central hub (8) such that upon rotation of the device, the chemical liquid supplied to an upper surface is dispersed by the fibres (9).

10 Claims, 2 Drawing Sheets

DROPLET APPLICATION DEVICE AND METHOD

The present invention relates to a droplet applicator device and method for operation of same.

It is presently known to utilize various forms of spraying devices for the distribution of herbicides, fungicides, fertilizers etc. Generally, such spraying devices are adapted to spray a relatively high volume of diluted chemical.

More recent methods of increasing the efficiency of such spraying devices include the utilization of rotary automizer discs, also known, as centrifugal energy nozzles, spinning disc automizers, or merely spinning discs. Such discs allow a reduction in the volume of chemical liquid or spray utilized, by delivering of low volumes of highly concentrated herbicide, fungicide, fertilizer, etc. These discs operate by spinning at relatively high speed to produce droplets of relatively uniform size, the chemical being fed onto the rotary automizer disc at a substantially central portion thereof such that the liquid is reduced to small droplets as it moves towards the outside of the disc by centrifugal force. Typically, the rotational speed of the disc is between 2000 to 5000 revolutions per minute. Some discs presently used have fine grooves etched in the upper surface thereof, radiating out from the central portion to the extremities thereof so as to enhance the generation of substantially even droplets. Typically, the diameter of such discs is between 5 and 10 cm.

It will be appreciated that such controlled drop applicators have a liquid holding capacity governed by the diameter of the disc and the speed at which the disc is rotated. In practice, the speed of rotation is usually not varied, and the liquid holding capacity is therefore dependent on the upper surface area of the disc. Unfortunately, when the disc becomes overloaded with liquid, the surplus liquid flows over the edge of the rim of the disc.

The present invention seeks to overcome the disadvantages of the prior art by providing a droplet applicator device in which the aforementioned problems are substantially ameliorated.

In one broad form, the present invention provides a droplet applicator device comprising a plurality of fibers radially extending from and rotatable about a central hub such that upon rotation of said device, liquid is dispensed via said fibers.

Preferably, the device is implemented wherein said device is substantially disc shaped, said fibers extending substantially perpendicular to the axis of said central hub, said central hub being substantially cylindrically shaped.

Also, preferably, said liquid is supplied to a top surface of said disc shaped device such that some of said liquid is dispensed from upper fibers forming said top surface, the remainder of said liquid being progressively dispensed by lower fibers as said liquid flows towards the bottom surface of said disc shaped device.

In a most preferred form of the invention, the density of said fibers increases from said top surface to said bottom surface of said device.

Also, in its preferred embodiment said bottom surface of said device is provided with a heavy concentration of fibers such that said bottom surface is substantially impervious to said liquid.

Also preferably, said device is attached to the end of a wand.

In a simplified form of the invention, said liquid is supplied thereto from a container by force of gravity.

However, alternatively, said liquid is supplied thereto from a container utilizing a hand operated pumping device.

Also, alternatively, the invention could be implemented wherein said liquid is supplied thereto from a pressurized container.

However, alternatively, the invention could be implemented wherein said liquid is supplied thereto by a pump means.

Most preferably, said container is embodied in a backpack arrangement.

Also most preferably, said device is rotated by means of an electric motor.

Said liquid utilized by the droplet applicator device may be pesticide, herbicide, fungicide or fertilizer.

The present invention will become more fully understood from the following detailed description thereof, in connection with the accompanying drawings, wherein.

Figure 1:
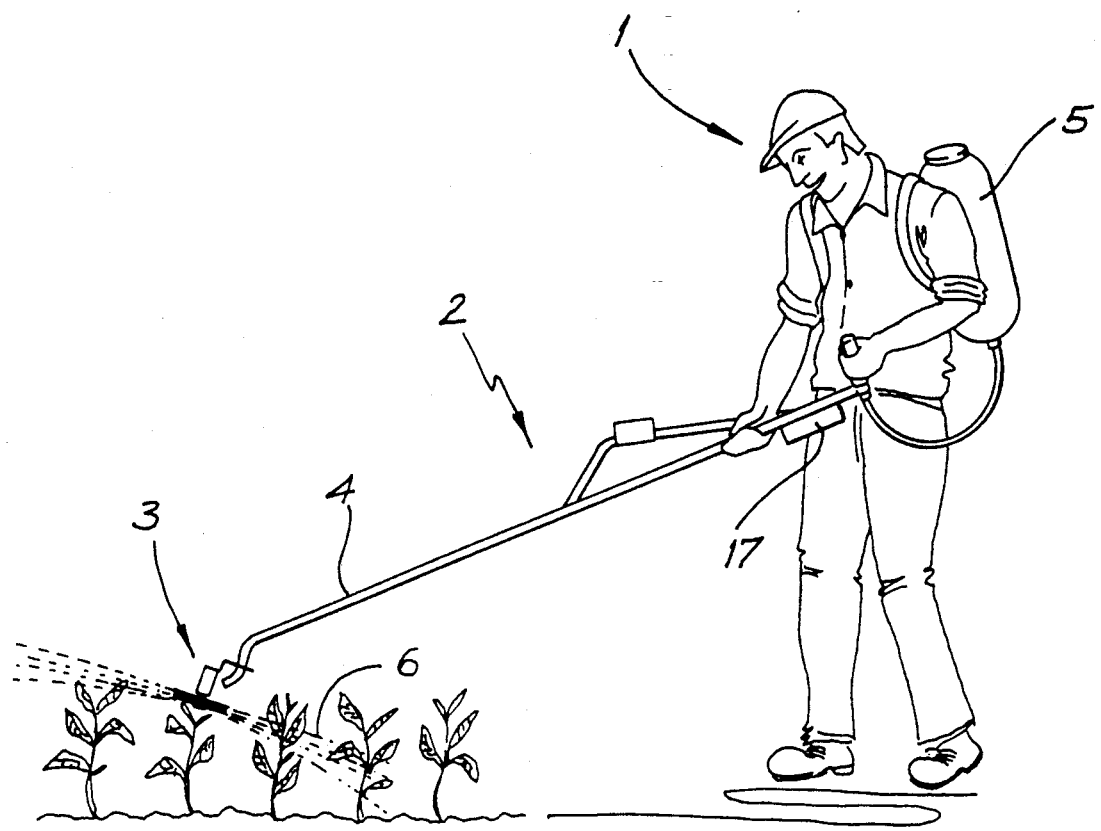
FIG. 1 illustrates operation of the droplet applicator device.

In FIG. 1 is illustrated an operator, generally designated by the numeral 1, holding an apparatus 2, utilized for the supply and distribution of a liquid herbicide, fungicide, or pesticide or the like. The apparatus 2 comprises a drop applicator device 3, provided at one end of a wand 4 to supply a chemical liquid from a container 5, for instance, a herbicide, fungicide, or pesticide. The droplet applicator device is shown providing droplets of the liquid device 6 over the vegetation, etc., to be treated.

Figure 2:
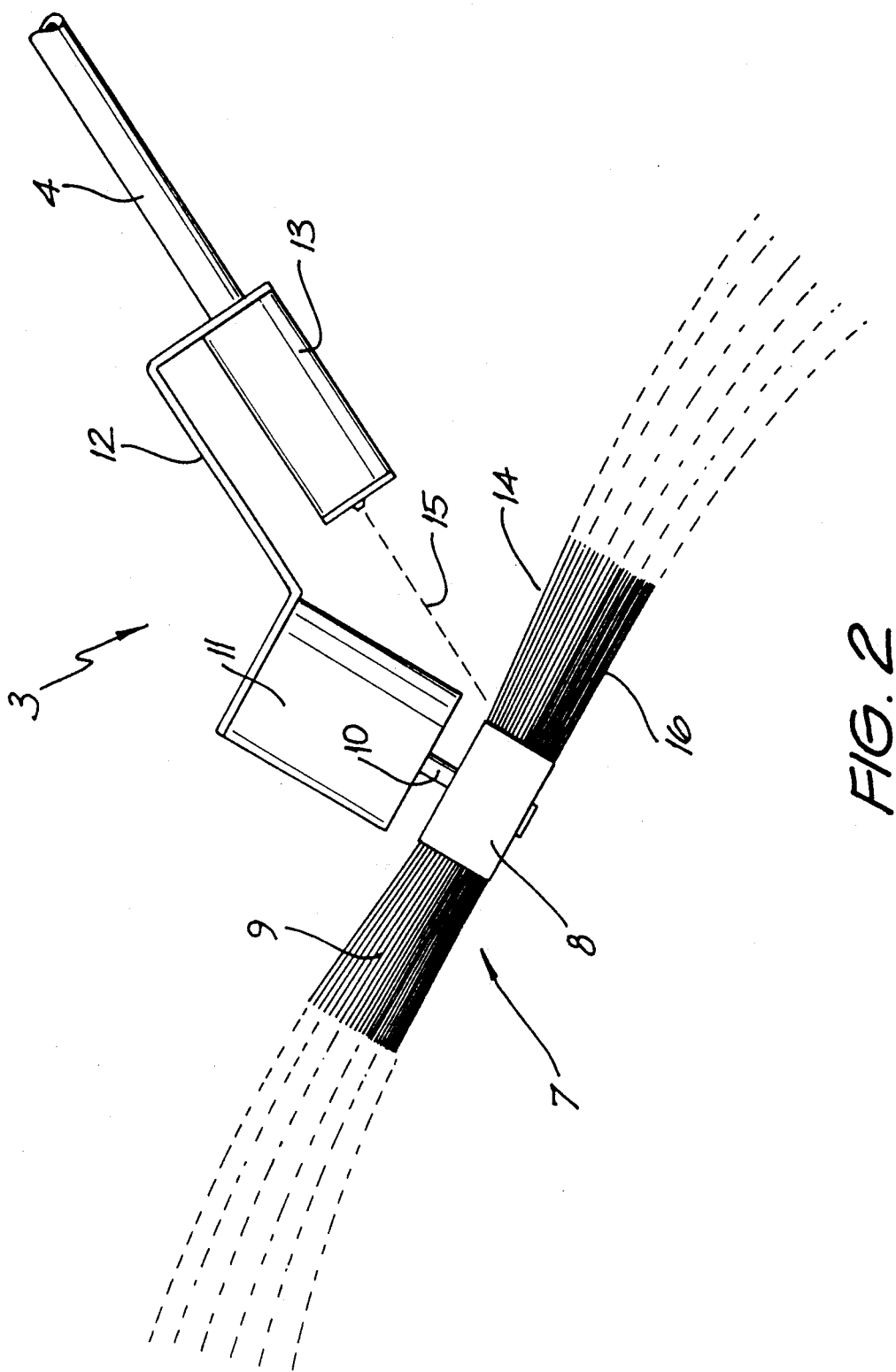
FIG. 2 illustrates an enlarged view of the applicator device in accordance with the preferred embodiment of the invention.

In FIG. 2 is illustrated an enlarged view of the droplet applicator device 3. It should be appreciated that this droplet applicator device illustrated is a preferred but non-limiting implementation of the invention. The droplet applicator device comprises a disc like member 7, which itself is comprised of a central cylindrically-shaped hub 8 having a plurality of fibers 9 extending perpendicular to the axis of the central hub 8, radially therefrom. The central hub 8 is connected via a shaft 10 to an electric motor 11 which facilitates rotation of the disc like member 7. The motor 11 is attached via support 12 to the wand 4. The liquid pesticide, herbicide or fungicide is supplied within the wand 4 and via the supply tubing 13 to the upper surface 14 of the disc like member 7. The liquid 15 is supplied preferably towards the central portion of the disc like member 7. Upon contact of the liquid 15 with the upper surface member 14 of the disc like member 7 and during rotation of the disc like member about the central shaft 10, the liquid flows under the action of centrifugal forces along the fibers elements 9. That is, when the disc 7 is rotated while liquid is flowing on to the substantially central portion of the upper surface member 15 centrifugal force flings droplets out along the fibers in a narrow spectrum of size to the rim and beyond. However, some liquid will pass down through the fibers towards the lower surface 16 of the disc like member 7 and gradually be dispersed by each of the fibers 9 as it travels towards the lower surface member 16.

In the preferred form of the invention, the density of the fibers attached to the hub increases from the upper surface member 14 to the bottom of the disc 16, to an extent where the base 16 is virtually liquid-proof, and droplets are flung from the increasingly less pervious lower layers, rather than leaking from the bottom.

It will be appreciated that the overload threshold for this type of disc like member is higher than for a solid surface of the known prior art controlled droplet applicators.

It will also be appreciated that the droplet size and rate of dosage can be substantially controlled by variation in the physical parameters of the device. For instance, the density of the fibers, the porosity of the fibers, the thickness of the fibers and the length of the fibers can all be varied, together with the speed of rotation of the device, to control the size of the droplets, and the rate of application.

In use, the disc and accompanying motor are mounted on the end of a wand 4 which may consist of a solid hollow tube through which liquid flows from a container 5 to be dispersed by the droplet applicator device 3. The liquid would flow from the base of a backpack arrangement 5 as illustrated in FIG. 1. Various other pumping means may also be provided, for instance, a hand pump, an electric pump, or, the liquid could be supplied in the container 5, under pressure. When a gravity feed system is utilized, a valve may be provided in the backpack arrangement such that atmospheric pressure is maintained and the liquid flow is unimpeded.

It will be appreciated by persons skilled in the art that appropriate power sources would also be provided on or about the wand 4 to provide power to the electric motor 11. This may, for instance, be embodied as a battery 17, shown in FIG. 1. The present invention has therefore been hereinbefore described in relation to a specific preferred embodiment wherein the droplet applicator device is a substantially disc shaped device. It will be appreciated that other forms of droplet applicator device may be embodied which may not necessarily be disc shaped, or operated in exactly the same manner as the embodiment hereinbefore described. It should therefore be understood that any variations and modifications which become obvious to persons skilled in the art should also be considered to fall within the spirit of the invention as hereinbefore described.

I claim:

1. A droplet applicator device for dispersing a liquid, said device comprising:

a substantially cylindrical shaped hub, said hub having an axis, a plurality of fibers extending from said hub, substantially perpendicular to said axis, said fibers forming a substantially disc-shaped device, the density of said fibers of said device progressively increasing from an upper surface of said disc-shaped device towards a lower surface thereof, when said liquid is supplied to said upper surface, and said disc-shaped device is rotated, droplets of said liquid are dispersed from the upper fibers, and the remainder of said liquid is progressively dispersed in larger droplets by lower and progressively denser fibers.

2. A droplet applicator device as claimed in claim 1, wherein said bottom surface of said device is provided with a heavy concentration of fibers such that said bottom surface is substantially impervious to said liquid.

3. A droplet applicator device as claimed in claim 1, wherein said liquid is attached to the end of a wand.

4. A droplet applicator device as claimed in claim 1, wherein said liquid is supplied thereto from a container by the force of gravity.

5. A droplet applicator device as claimed in claim 1, wherein said liquid is supplied thereto from a container utilizing a hand operated pumping device.

6. A droplet applicator device as claimed in claim 1, wherein said liquid is supplied thereto from a pressurized container.

7. A droplet applicator device as claimed in claim 1, wherein said liquid is supplied thereto by a pump means.

8. A droplet applicator device as claimed in claim 4, wherein said container is embodied in a backpack arrangement.

9. A droplet applicator device as claimed in claim 1, wherein said device is rotated by means of an electric motor.

10. A droplet applicator device as claimed in claim 1, wherein said liquid is pesticide, herbicide, fungicide or fertilizer.

* * * * *